US008688392B2

(12) United States Patent
Tam et al.

(10) Patent No.: US 8,688,392 B2
(45) Date of Patent: Apr. 1, 2014

(54) SYSTEM AND METHOD FOR TESTING A LIGHT SENSOR OF A PORTABLE ELECTRONIC DEVICE

(75) Inventors: Ching Yu John Tam, Los Gatos, CA (US); Bridget Bin Wu, Cupertino, CA (US); Ryan Jeffrey Du Bois, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 971 days.

(21) Appl. No.: 12/794,546

(22) Filed: Jun. 4, 2010

(65) Prior Publication Data

US 2011/0301885 A1 Dec. 8, 2011

(51) Int. Cl.
*G06F 19/00* (2011.01)
(52) U.S. Cl.
USPC ............... 702/57; 250/214 AL; 250/214 B; 250/338.1; 250/339.11
(58) Field of Classification Search
USPC .......... 702/57; 250/214 AL, 214 B, 205, 221, 250/338.1–338.3, 339.11
See application file for complete search history.

(56) References Cited

U.S. PATENT DOCUMENTS

| | | | |
|---|---|---|---|
| 6,177,955 B1 * | 1/2001 | Downen et al. | 348/189 |
| 7,170,606 B2 * | 1/2007 | Yerazunis | 356/432 |
| 7,351,947 B2 | 4/2008 | Dailey et al. | |
| 7,352,930 B2 | 4/2008 | Lowles | |
| 7,486,386 B1 | 2/2009 | Holcombe et al. | |
| 2007/0211046 A1 | 9/2007 | Taylor et al. | |
| 2009/0152441 A1 | 6/2009 | Pak et al. | |

* cited by examiner

*Primary Examiner* — Jonathan C. Teixeira Moffat
*Assistant Examiner* — Hien Vo
(74) *Attorney, Agent, or Firm* — Blakely, Sokoloff, Taylor & Zafman LLP (57) ABSTRACT

An improved system and method for testing a sensor of a portable electronic device based on expected sensor data and not timing information. The system and method for testing a sensor of a portable electronic device retrieves sensed data from the portable electronic device (i.e. device under test) after the device has traversed a series of test areas or zones. The sensed data is compared against a set of expected sensor data patterns to determine which components of the sensed data correspond to each test area or zone. The sensor of the portable electronic device may be tested based on an association of the test areas or zones with segments of the sensed data.

22 Claims, 9 Drawing Sheets

SYSTEM AND METHOD FOR TESTING A LIGHT SENSOR OF A PORTABLE ELECTRONIC DEVICE

BACKGROUND

An embodiment of the invention generally relates to methods and systems for testing a light sensor, and in particular to a test system that associates segments of sensed data sequence with respective, physical test areas based substantially on analysis of the sensed data and sensor data patterns and not based on timing information. Other embodiments are also described.

Modern portable electronic communications devices such as smart phones often include various sensors. Incorporation of sensors into portable electronic devices has facilitated the automation of a variety of tasks that traditionally require human input. For example, an ambient light sensor (ALS) integrated in a portable electronic device may detect available environmental light surrounding the device and report this light level to a screen adjustment unit. Based on this value, the screen adjustment unit may adjust the brightness of the portable electronic device's screen to allow a user to easily read the screen in variable lighting conditions without compromising battery life.

Although sensors integrated into portable electronic devices provide useful functions, their effectiveness is limited by their accuracy. In particular, a sensor which produces inaccurate readings likely will be ineffective and will cause the portable electronic device to be manipulated in an undesirable manner. For example, an ALS integrated into a portable electronic device which reports light levels at lower than actual values may cause the screen of the portable electronic device to be dimmed in a bright environment. This in turn will hinder a user's ability to read the dim screen in a relatively brighter surrounding environment.

In an effort to ensure the accuracy of sensors integrated within portable electronic devices, manufactures perform numerous tests of the sensors prior to releasing the devices to retailers. In a traditional method and system for testing a sensor integrated within a device under test (DUT), the DUT is placed on a conveyor belt and fed through a variety of areas or zones. Each zone or area presents a different testing scenario or environment by which the accuracy of the sensor within the DUT is tested. In each scenario, the sensor produces values corresponding to the given environment and these values are then stored. The stored values are then subsequently accessed and analyzed by dedicated test equipment to determine the accuracy of the sensor. Since various scenarios are being tested in succession, the times at which the DUT enters and exits each area or zone needs to be determined in order to ensure that the correct reference values are compared against the appropriate sensed data.

This timing information was obtained by painstakingly recording the times at which the DUT entered and exited each zone as the DUT traversed each zone. This system thus requires that detailed timing information be generated, recorded, and analyzed for each DUT.

SUMMARY

Testing sensors within portable electronic devices is useful for ensuring the devices properly function after being distributed to retailers and consumers. However, the large amount of sensors integrated into portable electronic devices has expanded the time it takes to properly test each device. For example, each new sensor introduced into a portable electronic device may warrant a new test or set of tests to ensure the sensor is properly functioning.

To lessen the amount of time it takes to test a device under test (DUT), an embodiment of the invention is directed to a system and method for conveying a DUT through a plurality of test areas in an unsynchronized manner. In one embodiment, each test area includes a testing environment/scenario for testing the accuracy of a sensor integrated within the DUT in an unsynchronized manner. A sensor integrated in the DUT records sensed data as it travels through each test area. After the DUT has traveled through each test area, the sensed data is compared against a set of expected sensor data patterns to determine which components of the sensed data corresponds to each test area. By associating the sensed data with the test areas and corresponding testing environments/scenarios based on expected sensor data patterns and not timing data, DUTs may be tested in a more efficient manner that does not require the recordation of timing data as the DUT traverses each test area.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
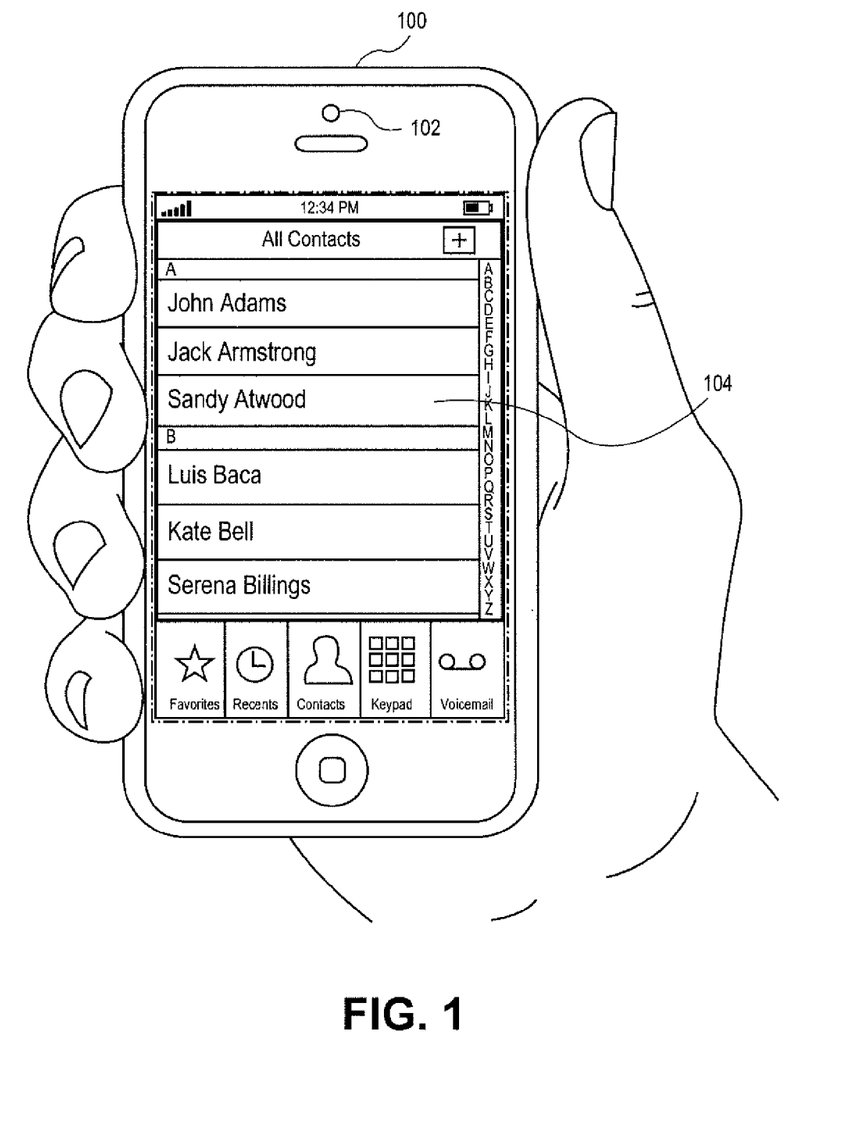
FIG. 1 is a top view of a portable electronic device containing proximity and ambient light sensor mechanisms to be tested.

FIG. 1 depicts a portable electronic device 100 that may be tested. The portable electronic device 100 may be a personal digital assistant, a smart phone, a portable audio device, or any similar apparatus. The portable electronic device 100 includes a sensor 102 which may be used to control the operation of the portable electronic device 100. Although only one sensor is shown in the portable electronic device 100 of FIG. 1, in other embodiments, the device 100 may include multiple sensors 102.

The sensor 102 may be an ambient light sensor, a proximity sensor, a temperature sensor, an accelerometer, a sound sensor, a combination of these sensors, or any other similar type of sensor that would be used in a portable electronic device. In one embodiment, the sensor 102 is a combination ambient light and proximity sensor (hereinafter "ALS/Prox sensor 102").

The ALS/Prox sensor 102 may simultaneously detect both the level of ambient light in the environment surrounding the portable electronic device 100 and s the presence of nearby objects (without any physical contact with the objects). An example embodiment of the ALS/Prox sensor 102 will now be described.

The ALS/Prox sensor 102 comprises both an ambient light component and a proximity component. The ambient light component includes a light detector for sensing the intensity of ambient light in the surrounding environment. In one embodiment, the detector contains red, green, blue, and clear components, although alternative photodetector arrangements are possible. The detected characteristics of the ambient light may be subsequently output (in digital format) to a processing unit of the portable electronic device 100 and then used to adjust various functions or settings in the portable electronic device 100. For example, the brightness of a display screen 104 integrated in the portable electronic device 100 may be adjusted by the processing unit based on the sensed ambient light level such that the screen may be better viewed by a user in bright or dim environments.

The proximity component of the ALS/Prox sensor 102 includes an emitter and a receiver. The emitter emits an electromagnetic or electrostatic field or a beam of electromagnetic radiation (e.g. infrared light) directed outwards of the device 100, and the receiver looks for changes in a return signal caused by the emitted field or beam's reflection to determine the presence or proximity of a nearby object. The return signal is processed and a resulting proximity determination is then output to a processing unit of the portable electronic device 100. Different types of emitters and receivers may be used to detect different types of objects. For example, a capacitive or photoelectric proximity emitter and receiver might be suitable for detecting a plastic target while an inductive proximity emitter and receiver is more suitable for detecting a metal target. Accordingly, different combinations of emitters and receivers may be used according to the intended targets.

The output proximity determination of the ALS/Prox sensor 102 may facilitate various functions in a portable electronic device 100. For example, the proximity component may detect the presence of the head of a user and infer that the device is being used in handset mode (the user holds the device 100 up to his/her ear) in response, the display screen of the portable electronic device 100 may be turned off to save power and in the case of a touch screen prevent inadvertent touch commands from being triggered as the user holds the device 100 up to his/her ear.

As noted above, the ALS/Prox sensor 102 is useful for efficiently and conveniently operating the portable electronic device. However, if the ALS/Prox sensor 102 is malfunctioning or un-calibrated, operation of the portable electronic device may be adversely affected.

Figure 2:
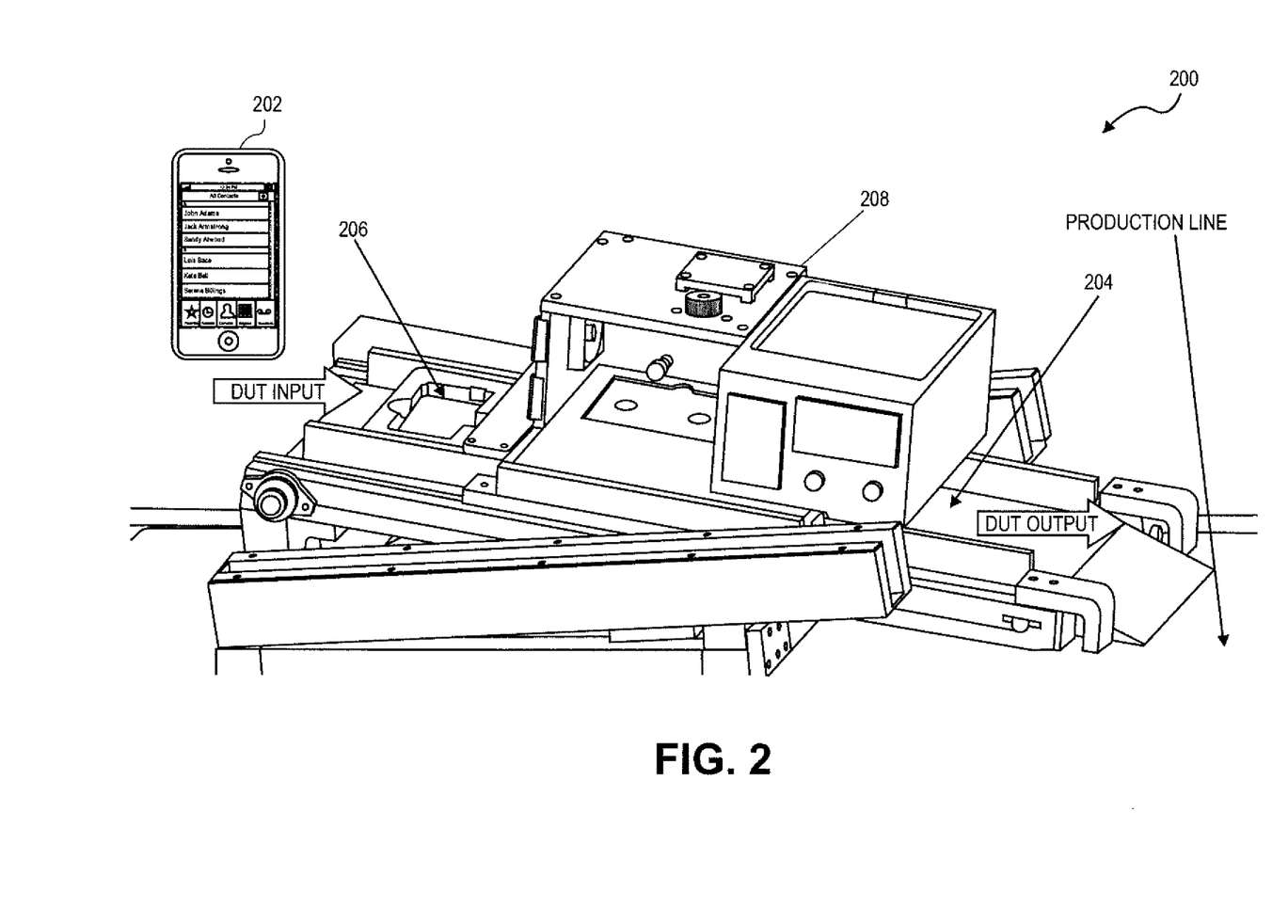
FIG. 2 is a diagram of a data collection fixture for testing sensors of a device under test (DUT), which includes a multi-zone testing frame.

FIG. 2 is a diagram of a data collection fixture 200 for testing sensor of a device under test (DUT) 202. The DUT 202 may be the portable electronic device 100 which incorporates ALS/Prox sensor 102. The data collection fixture 200 may be part of a manufacturing facility and be used by the manufacturer of the DUT 202 to test and/or analyze sensor functionality prior to sending the DUT 202 to retailers. Alternatively, the data collection fixture 200 may be used in a retail establishment to ensure that the DUT 202, in this case a previously sold unit that is being returned by its end user, or a new unit that is being checked for any damage during shipping to the retailer is properly functioning.

The data collection fixture 200 comprises a transportation system 204, a DUT holder 206, and a testing frame 208. Each of these elements of the data collection fixture 200 will be described in further detail below.

The transportation system 204 is a mechanism for transporting the DUT 202 through the testing frame 208. The transportation system 204 may be a conveyor belt system, a gravity roller conveyor system, a gravity skatewheel conveyor system, a belt conveyor system, a wire mesh system, a plastic belt system, a belt driven live roller system, a lineshaft roller conveyor system, a chain conveyor system, a screw conveyor system, a chain driven live roller conveyor system, or a overhead conveyor system. As shown in the example depicted in FIG. 2, the transportation system 204 is a conveyor belt that operates in this example in a clockwise direction to transport the DUT 202 through the testing frame 208 (e.g. at a constant speed).

The DUT holder 206 is a device for holding the DUT 202 as it is transported on the transportation system 204. The DUT holder 206 may be adjustable to match different sized and shaped DUTs. In one embodiment, the DUT holder 206 includes a test data connection to connect the DUT 202 with an external test computer or system. The test data connection may be an IEEE 1394, Universal Serial Bus (USB), or any similar connection medium supported by the DUT 202. The test data connection allows the DUT 202 to transfer sensed data to the external test computer while the DUT 202 is transported through the testing frame 208 by the transportation system 204. In this embodiment, the sensed data (e.g. from the ALS/Prox sensor 102) does not need to be stored locally on the DUT 202, but is instead stored and processed in the external computer system.

The DUT holder 206 may firmly hold the DUT 202 in a static position as the DUT 202 is carried by the transportation system 204. The DUT holder 206 may be integrated into the transportation system 204 (i.e. molded into a conveyor belt) or it may be removably coupled thereto. In some embodiments, the transportation system 204 may accommodate multiple DUT holders 206 such that multiple DUTs 202 may be transported on the transportation system 204 at the same time. In some embodiments, the DUT holder 206 is formed from or includes a malleable material for ensuring a tight fit between the DUT 202 and the DUT holder 206. The malleable material may also aid in absorbing shock while the DUT 202 travels through the transportation system 204 thereby reducing damage to the DUT 202 during testing procedures. For example, the DUT holder 206 may be made of silicone, rubber, soft plastic, or a combination of these materials.

In one embodiment, the DUT holder 206 is defined by an open-ended box structure. The DUT 202 is placed in the box structure such that a sensor integrated into the DUT 202 (e.g. ALS/Prox sensor 102) is facing or is exposed to the open-end of the box. Exposure allows the sensor to be tested while the DUT 202 travels through the testing frame 208. For example, in the portable electronic device 100, the ALS/Prox sensor 102 would be open to the elements such that it is exposed to light, reflectors, and other testing items that are present in the testing frame 208.

Figure 3:
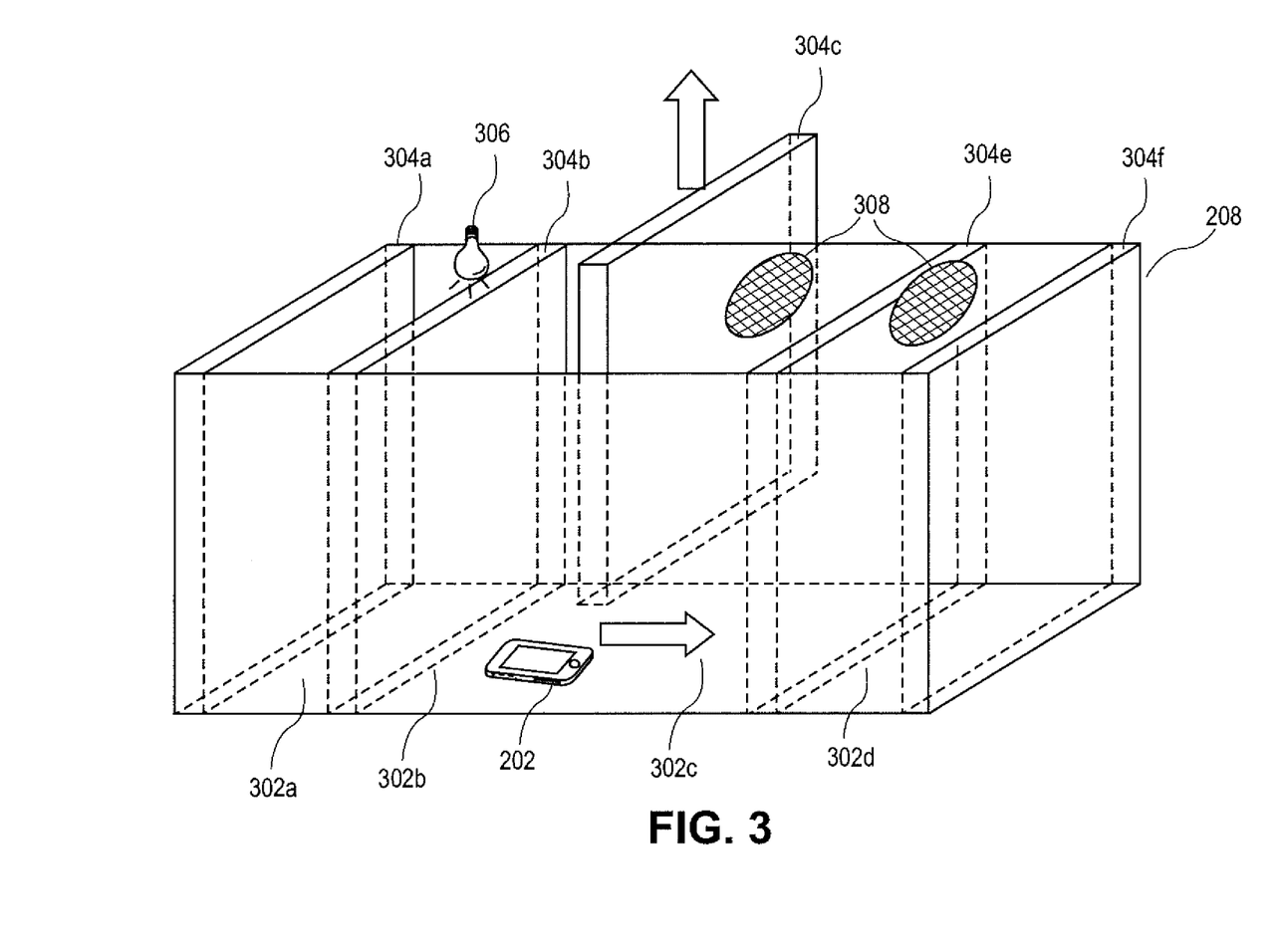
FIG. 3 shows one embodiment of a testing frame with a top cover removed.

FIG. 3 shows one embodiment of a testing frame 208 with a top cover removed. The testing frame 208 is divided into multiple test areas 302 by separating walls 304. The testing frame 208 further includes a light source 306 and reflectors 308 which provide a testing environment/scenario for testing the accuracy of a sensor integrated within the DUT 202. Although the testing environments/scenarios shown are geared toward the testing of light and proximity sensors, other testing environments or scenarios may be provided to test sound, acceleration, temperature, and other similar sensors.

Figure 4:
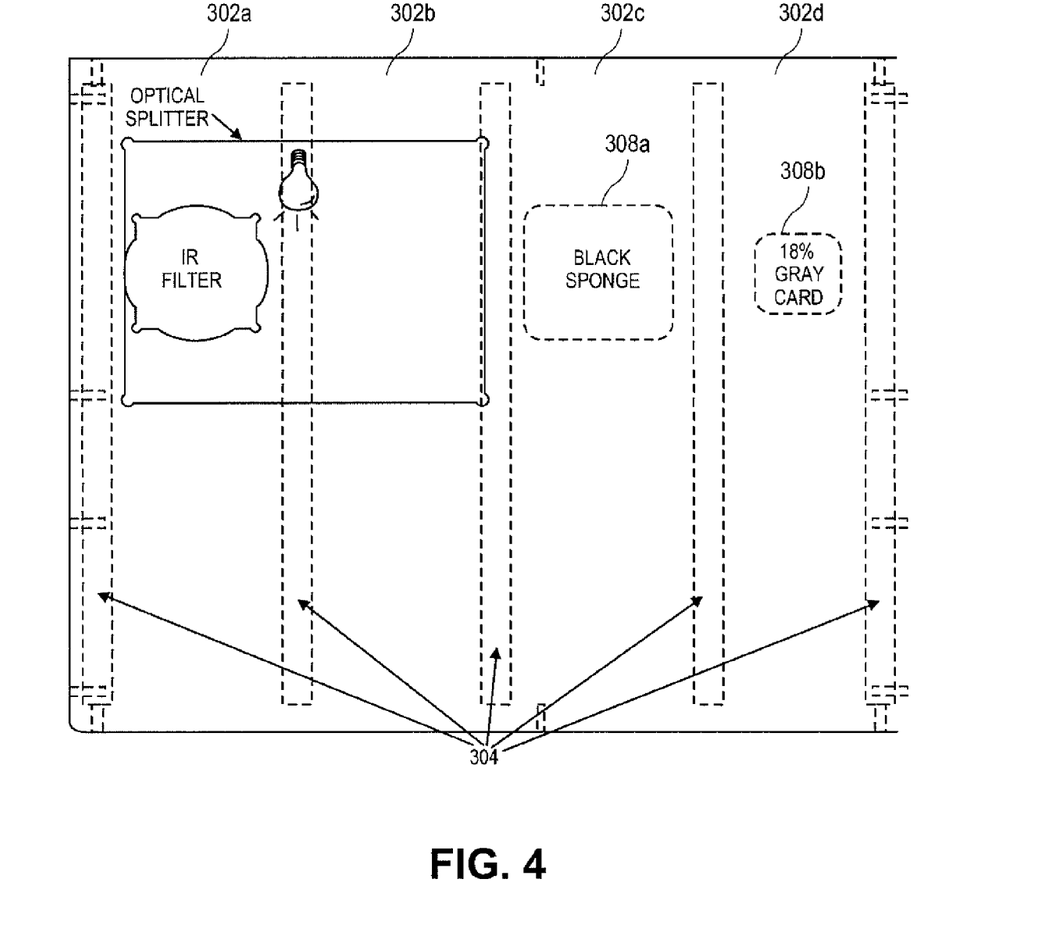
FIG. 4 is an overhead view of the testing frame.

In one embodiment, light from the light source 306 illuminates a first set of test areas 302a and 302b. For example, the light may be used to test the accuracy of an ambient light sensor integrated in the DUT 202 (e.g. the ALS/Prox sensor 102). The light may be calibrated to provide a known illumination level. In some embodiments, the light may be passed through one or more optical splitters and filters prior to illuminating each of the first set of test areas 302a and 302b. For example, in the testing frame 208 shown in FIG. 4, light passes through an infrared cut-off filter prior to illuminating test area 302a and light passes through white clear glass before being exposed to test area 302b. The separating walls 304 may prevent any light from leaking between adjacent test areas 302a, 302b and from sources external to the testing frame 208 (e.g. warehouse lighting); they may also ensure that a closed testing environment or scenario is provided in test areas 302a and 302b. The light provided by the light source 306 may be used to test the accuracy of the sensor integrated in the DUT 202.

Returning to FIG. 3, in one embodiment, reflectors 308a and 308b may be placed in test areas 302c and 302d of the testing frame 208. The test area 302c and 302d in this case are distinct from test area 302a and 302b (created by their respective walls 304c, e). In the overhead view of a testing frame 208 shown in FIG. 4, the reflector 308a consists of a black sponge placed in test area 302c, while reflector 308b is an 18% gray card placed in test area 302d. The black sponge may absorb some or alternatively essentially all of the infrared light emitted by the proximity sensor component of the DUT 202 such that offset testing may be performed on the proximity sensor. The 18% gray card is an infrared reflective material that reflects some of the infrared light emitted by the proximity sensor such that general accuracy tests may be performed on the proximity sensor. As described above, the separating walls 304 prevent visible and invisible (i.e. infrared light) from leaking between test areas 302 or from sources external to the testing frame 208 (i.e. warehouse lighting) and ensure that a closed testing environment/scenario is provided in test areas 302c and 302d. Accordingly, testing of the sensor may be performed in a controlled environment within the test areas 302.

In some embodiments, the separating walls 304 are mechanically moveable to allow the DUT 202 traveling on the transportation system 204 to enter and exit the test areas 302. For example, as the DUT 202 approaches separating wall 304c seen in FIG. 3, the separating wall 304c moves upward to allow the DUT 202 to enter test area 302c. After the DUT 202 has entered the test area 302c, the separating wall 304c moves downward to close off the test area and ensure light does not leak in or out of the closed environment within the test area 302c. After testing has completed in the test area 302c, the separating wall 304d moves upward to allow the DUT 202 to leave the test area 302c and enter the adjacent test area 302d. This process of moving the separating walls 304 may continue for each separating wall 304 such that the DUT 202 and every subsequent DUT may enter and exit each of the test areas 302 automatically while preventing light leakage between the test areas 302 and from external sources and ensuring that a closed testing environment/scenario is provided in each of the test areas 302.

Figure 5:
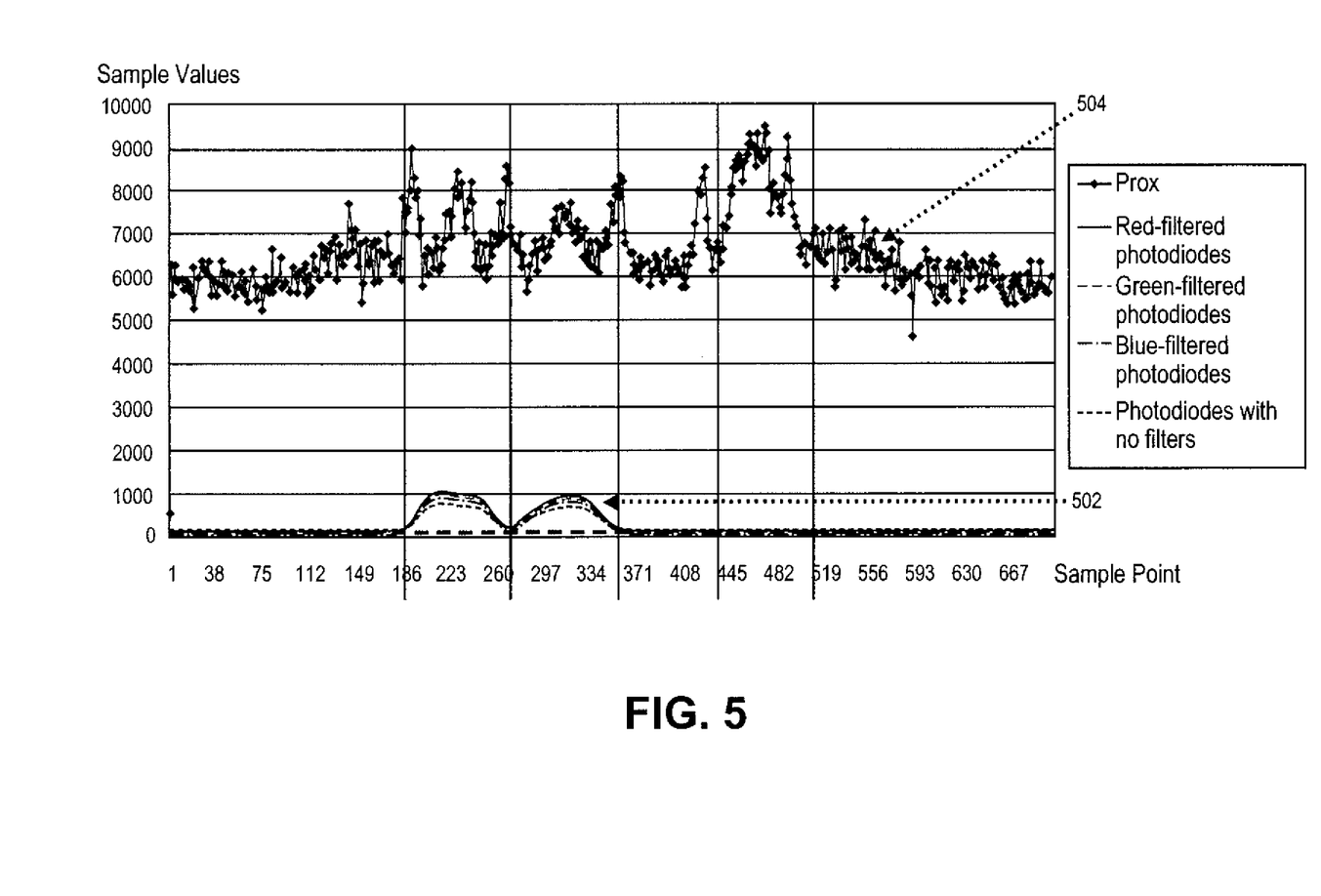
FIG. 5 is an example of sensed data produced by the DUT.

After the DUT 202 has exited the test frame 208, data that was sensed by the DUT 202 while traveling through the test frame 208 may be examined to determine the accuracy of the tested DUT's sensor. FIG. 5 is an example of sensed data retrieved from the DUT 202. In this example, the DUT 202 is the portable electronic device 100 with the ALS/Prox sensor 102 as shown in FIG. 1. Thus, the sensed data shown in FIG. 5 includes both an ambient light data set 502 and a proximity data set 504.

The sensed data includes a series of samples for both the ambient light component (i.e, ambient light data set 502) and the proximity component (i.e, proximity data set 504) of the ALS/Prox sensor 102. With respect to the ambient light data set 502, each sample point includes a red, green, blue, and clear channel sample values. With respect to the proximity data set 504, each sample point consists of a single value representing the distance a sensed object is from the DUT 202.

In one embodiment, the transportation system 204 transports the DUT 202 in an unsynchronized manner such that timing information is not kept regarding when the DUT 202 enters or exits each of the test areas 302. To the untrained eye it is unclear which segments or pieces of the ambient light data set 502 and the proximity data set 504 correspond to each of the test areas 302 (and their corresponding test environments/scenarios). Accordingly, prior to analyzing the sensed data to determine the accuracy of the ALS/Prox sensor 102, both the ambient light data set 502 and the proximity data set 504 need to be examined to determine which segments of each correspond to each of the test areas 302.

Figure 6:
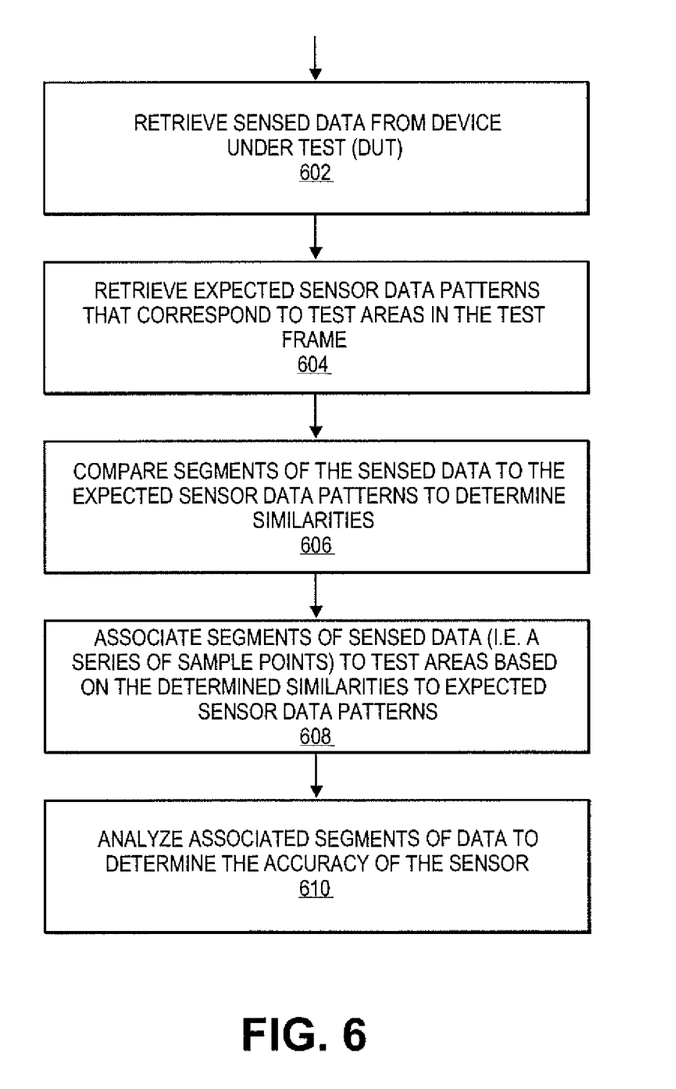
FIG. 6 is a flow diagram of a test area determination process for examining the sensed data to determine which sample points in the data correspond to the presence of the DUT in each of the test areas.

FIG. 6 is a flow diagram of a test area determination process 600 for examining the sensed data to determine which sample points correspond to each of the test areas 302. Process 600 may be run entirely by the DUT 202 (using internal data processing capability), entirely by an external computer system, or by a combination of the two.

In process 600, the type of light, reflectors, and other test components used in each of the test areas 302, as well as certain broad characteristics of the sensor data patterns associated with each test area are known. However, the times when the DUT 202 enters and exits each test area 302 and consequently which sample points of the sensed data correspond to each test area 302 are unknown, because the DUT 202 has been transported through the test areas 302 at unsynchronized intervals.

In one embodiment, the test area determination process 600 may commence operation after a user has manually initiated its operation. In another embodiment, the test area determination process 600 automatically commences operation after the DUT 202 has exited the test frame 208.

The test area determination process 600 begins at operation 602. At operation 602, the sensed data is retrieved from the DUT 202. In some embodiments, the sensed data is retrieved from a storage area of the DUT 202 after the DUT 202 has exited the test frame 208, and then passed to a data processing element of the DUT 202 where it is examined. In other embodiments, the sensed data is retrieved from the DUT 202 and downloaded/uploaded to an external computer system before it is examined.

In operation 604, expected sensor data patterns are retrieved that are associated with each test area 302 of the test frame 208. These are data patterns that should be produced by a properly functioning sensor of a known type as it is exposed to the test components in a test area. Each test area 302 is associated with a different sensor data pattern, for each type of sensor that is incorporated in the DUT 202. For example, test area 302*a* has a sensor data pattern for an ambient light sensor and a sensor data pattern for a proximity sensor.

In one embodiment, the sensor data patterns may be represented by a series of rules which define the start and end of a testing environment or scenario (e.g. describing one or more sample points in the sensed data which represent the point in time at which the DUT 202 has entered a test area 302, and the point in time at which the DUT 202 exits the test area 302). For example, the expected sensor data pattern of an ambient light sensor entering test area 302*a* may be defined by {If (RedLightValue[X]>=400|GreenLightValue[X]>= 400|BlueLightValue[X]>=400|ClearLightValue[X]>= 400) Then SamplePoint[X]=EntryPoint[TestArea302*a*]} and the expected sensor data pattern of an ambient light sensor exiting the test area 302*a* may be defined by {If(RedLightValue [X]<400 GreenLightValue[X]<400|BlueLightValue[X]< 400|ClearLightValue[X]<400) Then SamplePoint[X]= Exit-Point[TestArea302*a*]}. See also the ambient light sensor data sequence 502 in FIG. 5.

In another embodiment, the expected sensor data patterns are a series of data values with corresponding degrees of tolerances for each value. For example, the expected sensor data pattern of an ambient light sensor into test area 302*a* may be (Red Light Value=400±100), and the expected sensor data pattern corresponding to an exit point of the test area 302*a* may be (Red Light Value=100±100). The expected sensor data patterns may be stored in the DUT 202.

Operation 606 performs a comparison between the expected sensor data patterns and the sensed data to determine similarities between them. For example, using the example sensed data shown in FIG. 5, the ambient light data set 502 is compared with the sensor data patterns for each test area 302 associated with ambient light sensors and the proximity data set 504 is compared with the sensor data patterns for each test area 302 associated with the proximity sensors. In one embodiment, the comparison takes into account degrees of tolerance associated with an expected data pattern such that the sensed data does not need to be identical to the expected sensor data pattern, in order to detect an entry or exit point for a test area 302, but instead they only need to be similar. The comparison may be performed by an internal data processing component of the DUT 202, by an external computer system, or by a combination of the DUT 202 and an external computer system.

Figure 7A:
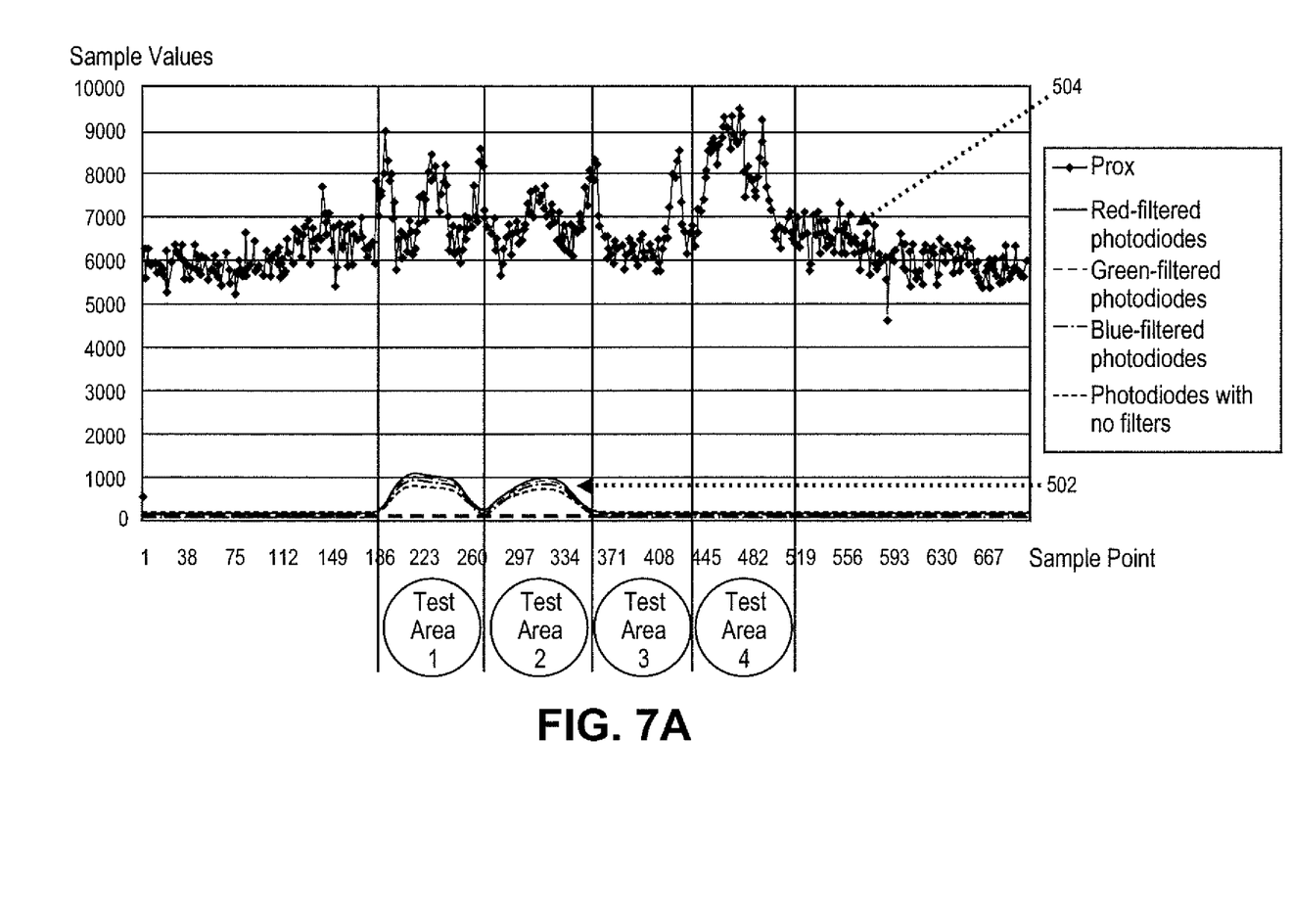
FIG. 7*a* shows an example result of the process of FIG. 6, as an association of segments of the sensed data with the various test areas.
Figure 7B:
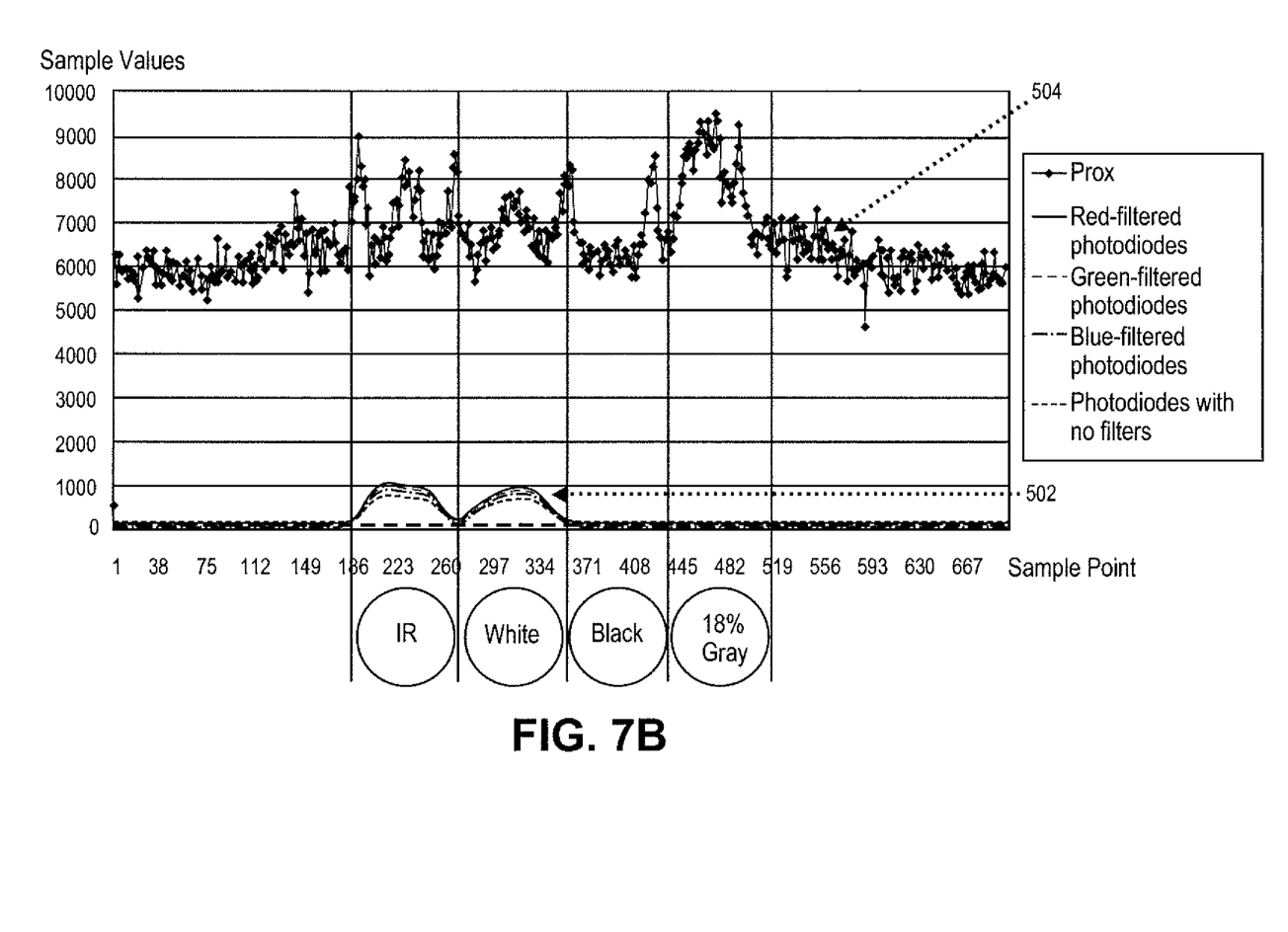
FIG. 7*b* shows another result of the process of FIG. 6, in which different segments of the sensed data have been associated with different test scenarios.

In operation 608, the entry and exit points have been established for each test area and the data sequence 502, 504 may be tagged or marked accordingly, as shown in FIG. 7*a*. Note that the mark up of the segments for test areas 3 and 4 was a result of examining the sensed Prox data whereas the segments for test areas 1 and 2 were found as a result of examination of the sensed ALS data. FIG. 7*a* shows an example association of the segments of sensed data from FIG. 5 with the test areas 302. In one embodiment, the segments of the sensed data may also be associated with types of test scenarios or environments presented in each associated test area 302. FIG. 7*b* shows such an association. This association or marking of the segments of the sensed data may be performed in the DUT 202, or in an external computer system.

In operation 610, the segments of sensed data are analyzed to determine the accuracy of the sensor. This analysis may also be performed on the DUT 202 or it may be delegated to an external computer system.

In one embodiment, the accuracy of the sensor is determined by comparing segments of the sensed data with projected sensor values.

Figure 8:
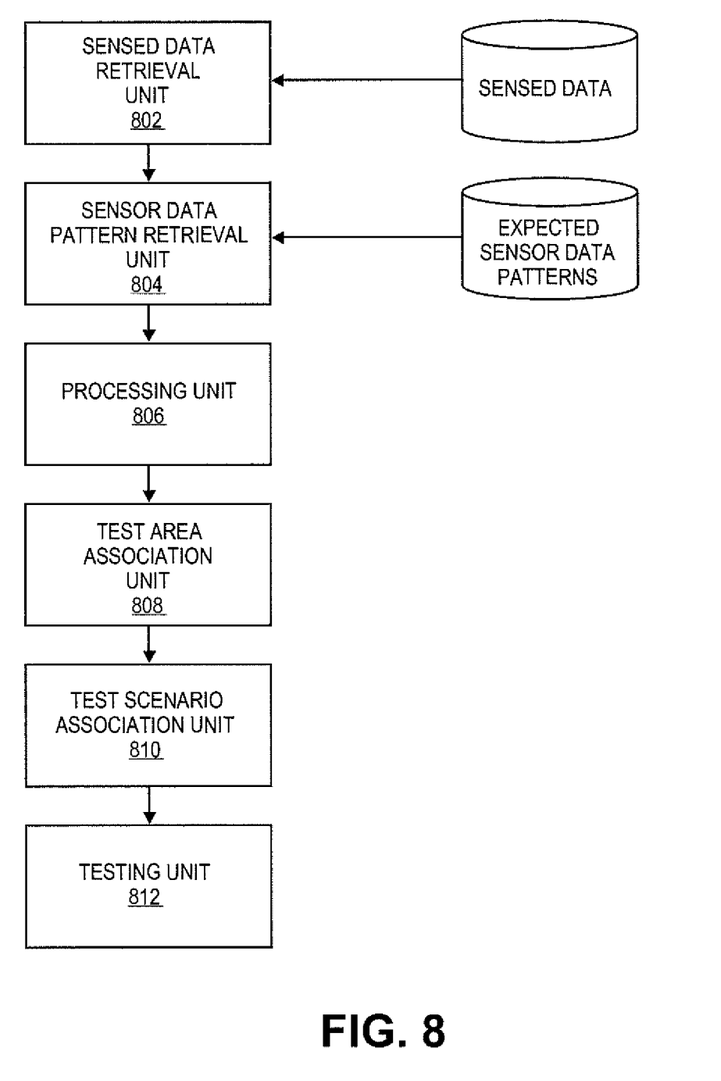
FIG. 8 is a system diagram for one embodiment of a test area determination system.

FIG. 8 illustrates a system diagram for one embodiment of a test area determination system 800. The system 800 may be entirely in the DUT 202, entirely in an external computer system, or in a combination of the DUT 202 and an external computer system. The components of the system 800 may be implemented as various combinations of mechanical and electrical elements that can be found in a typical portable electronic device, e.g. microelectronic digital sensors, specially programmed processors (programmed in accordance with the algorithm of FIG. 6), microelectronic memory (storage), and related interconnecting circuitry. In one embodiment, some or all of the algorithm operations of the test area determination process 600 described above in connection with FIG. 6 may be performed by the components of the test area determination system 800 as described below. Note that some or all of the components depicted in FIG. 8 may be implemented entirely as hardwired logic circuits, however for greater flexibility, a combination of hardwired logic circuitry and programmable logic or data processing components may be used instead.

In one embodiment, the test area determination system 800 may commence operation after a user has manually initiated its operation. In another embodiment, the test area determination system 800 automatically commences operation after the DUT 202 has exited the test frame 208.

As the test area determination system 800 commences operation, sensed data retrieval unit 802 retrieves sensed data from a storage area of the DUT 202. The DUT 202 makes the sensed data available to the other system components of the DUT 202 and to external systems (e.g. an external computer system) through a push or pull data retrieval schema. In one embodiment, operation 602 of FIG. 6 may be performed by the sensed data retrieval unit 802.

After the sensed data has been retrieved by the sensed data retrieval unit 802, sensor data pattern retrieval unit 804 retrieves sensor data patterns associated with the tests areas 302 and by relation associated with the test environments/scenarios within each test area 302. The sensor data patterns may be stored in the DUT 202, an external storage system, or in a combination of both the DUT 202 and an external storage system. The DUT 202 and/or an external storage system make the sensor data patterns available to the other system components of the DUT 202 and to external systems (e.g. an external computer system) through a push or pull data retrieval schema. In one embodiment, operation 604 of FIG. 6 may be performed by the sensed data retrieval unit 804.

After both the sensed data and the sensor data patterns have been retrieved by the sensed data retrieval unit 802 and the sensor data pattern retrieval unit 804, respectively, processing unit 806 compares segments of the sensed data and the sensor data patterns to determine similarities. The processing unit 806 may be located in the DUT 202 and/or an external storage system. In one embodiment, operation 606 of FIG. 6 may be performed by the processing unit 806.

After segments of the sensed data are determined to be similar to the sensor data patterns by the processing unit 806, test area association unit 808 associates the segments of the sensed data with a corresponding test area 302. These associations between segments of the sensed data and the test areas 302 may be used to later to determine the accuracy of the sensor incorporated in the DUT 202. In one embodiment, the associations between segments of the sensed data and the test areas 302 may be stored in the DUT 202. In another embodiment, the associations between segments of the sensed data and the test areas 302 are stored in an external storage system. In one embodiment, operation 608 of FIG. 6 may be performed by the test area association unit 808.

The test scenario association unit 810 associates the segments of the sensed data with a corresponding test scenario/environment located within the associated test area 302. These associations between segments of the sensed data and the test scenarios may be used to later to determine the accuracy of the sensor incorporated in the DUT 202. In one embodiment, the associations between segments of the sensed data and the test areas 302 may be stored in the DUT 202. In another embodiment, the associations between segments of the sensed data and the test areas 302 are stored in an external storage system. In one embodiment, operation 608 of FIG. 6 may be performed by the test scenario association unit 810.

Following the association performed by the test area association unit 808 and the test scenario association unit 810, the testing unit 812 tests the sensor integrated in the DUT 202 based on these associations and the sensed data. In one embodiment, the testing unit 812 test the sensor integrated into the DUT 202 by comparing the sensed data against test values. In one embodiment, the test values are the expected sensor data patterns previously retrieved by the sensed data retrieval unit 802. In one embodiment, operation 610 of FIG. 6 may be performed by the testing unit 812.

To conclude, various aspects of a technique for examining sensed data to determine which sample points correspond to test areas of a test frame. As explained above, an embodiment of the invention may be a machine-readable medium such as one or more solid sate memory devices having stored thereon instructions which program one or more data processing components (generically referred to here as "a processor" or a "computer system") to perform some of the operations described above. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the system and process above have been described in terms of an ambient light and proximity sensor, other sensors may be used and tested. For example the DUT 202 may include a temperature sensor, an accelerometer, a sound sensor, or any other similar type of sensor instead of an ambient light and proximity sensor. The description is thus to be regarded as illustrative instead of limiting.

What is claimed is:

1. A personal mobile device light sensor test system, comprising:
   a frame having:
      a first area; and
      a second area separated from the first area with walls;
   a transport system to carry a device under test (DUT) containing a sensor through the first and second areas;
   a first test scenario located in the first area and not in the second area;
   a second test scenario located in the second area and not in the first area;
   a processing unit to analyze sensed data that was sensed by the DUT's sensor while the DUT was being carried through the first and second areas to determine, based on the sensed data and not timing information, what segments of the sensed data were sensed in the first area and what segments of the sensed data were sensed in the second area; and
   a sensor data pattern retrieval unit for retrieving sensor data patterns associated with the first test scenario and the second test scenario, wherein the sensor data patterns correspond to data produced by a properly functioning sensor, of a same type as the sensor of the DUT, as the properly functioning sensor is exposed to the first test scenario and the second test scenario,
   wherein the processing unit determines what segments of the sensed data were sensed in the first area and what segments of the sensed data were sensed in the second area by comparing the sensed data with the sensor data patterns.

2. The personal mobile device light sensor test system of claim 1, further comprising:
   a test area association unit for associating segments of the sensed data with one of the first test area and the second test area based on the comparison performed by the processing unit.

3. The personal mobile device light sensor test system of claim 1, further comprising:
   a test scenario association unit for associating segments of the sensed data with one of the first test scenario and the second test scenario based on the comparison performed by the processing unit.

4. The personal mobile device light sensor test system of claim 1, wherein the first test scenario comprises a visible light emitter for emitting visible light at the sensor of the DUT.

5. The personal mobile device light sensor test system of claim 1, wherein the second test scenario comprises a reflector for reflecting infrared light emitted by the sensor of the DUT.

6. The personal mobile device light sensor test system of claim 1, wherein the sensed data comprises light characteristic values sensed by the sensor of the DUT at a plurality of times as the DUT is in each area of the frame.

7. The personal mobile device light sensor test system of claim 1, wherein the sensor data patterns are a set of sample data points with degrees of tolerances for each data point.

8. A process for testing a light sensor, comprising:
   moving a device under test (DUT) through a series of zones, wherein the DUT includes the light sensor;
   providing alight to be sensed by the sensor in one of the zones;
   sensing, by the light sensor, in each of the zones to produced sensed data;
   retrieving a sensor data pattern associated with the light, wherein the sensor data pattern corresponds to data produced by a properly functioning sensor, of a same type as the light sensor of the DUT, as the properly functioning sensor is exposed to the light; and analyzing the sensed data to determine, based on comparing the retrieved sensor data pattern with the sensed data and not timing information, what portion of the sensed data corresponds to the light that was sensed by the light sensor in one of the zones.

9. The process for testing the light sensor of claim 8, wherein analyzing the sensed data includes determining what portion of the sensed data corresponds to the light that was sensed by the light sensor in the one of the zones by comparing the sensed data with the sensor data pattern.

10. The process for testing the light sensor of claim 9, further comprising:

associating a portion of the sensed data with the zone which included the light based on the comparison between the sensed data and the sensor data pattern.

11. The process for testing the light sensor of claim 9, further comprising:

associating a portion of the sensed data with the light based on the comparison between the sensed data and the sensor data pattern.

12. The process for testing the light sensor of claim 8, wherein the light is a visible light and the sensor is a visible light sensor.

13. The process for testing the light sensor of claim 8, wherein the light is an infrared light and the sensor is an infrared light sensor.

14. A personal mobile device light sensor test system, comprising:

a sensor data pattern retrieval unit for retrieving sensor data patterns associated with a first test environment and a second test environment, wherein the sensor data patterns correspond to data produced by a properly functioning sensor, of a same type as a sensor of the device under test (DUT), as the properly functioning sensor is exposed to the first test environment and the second test environment; and a processing unit to analyze sensed data that was sensed by the DUT's sensor while the DUT was being carried through the first and second test environments to determine, based on the sensed data and not timing information, what segments of the sensed data were sensed in the first test environment and what segments of the sensed data were sensed in the second environment, wherein the processing unit determines what segments of the sensed data were sensed in the first environment and what segments of the sensed data were sensed in the second environment by comparing the sensed data with the sensor data patterns.

15. The personal mobile device light sensor test system of claim 14, further comprising:

a test scenario association unit for associating segments of the sensed data with one of the first test scenario and the second test scenario based on the comparison performed by the processing unit.

16. The personal mobile device light sensor test system of claim 14, wherein the first test scenario comprises a visible light emitter for emitting visible light at the sensor of the DUT.

17. The personal mobile device light sensor test system of claim 14, wherein the second test scenario comprises a reflector for reflecting infrared light emitted by the sensor of the DUT.

18. The personal mobile device light sensor test system of claim 14, wherein the sensed data comprises light characteristic values sensed by the sensor of the DUT at a plurality of times as the DUT is in each of the first and second test scenarios.

19. The personal mobile device light sensor test system of claim 14, wherein the sensor data patterns are a set of sample data points with degrees of tolerances for each data point.

20. An article of manufacture comprising:

a non-transitory machine readable computer storage medium having stored instructions that program a computer system to:

retrieve sensor data patterns associated with a first test environment and a second test environment, wherein the sensor data patterns correspond to data produced by a properly functioning sensor, of a same type as a sensor of the DUT, as the properly functioning sensor is exposed to the first test environment and the second test environment; and process sensed data that was sensed by the DUT's sensor while the DUT was being carried through the first and second test environments to determine, based on the sensed data and not timing information, what segments of the sensed data were sensed in the first test environment and what segments of the sensed data were sensed in the second environment.

21. The article of manufacture of claim 20, wherein the instructions program the computer system to determine what segments of the sensed data were sensed in the first environment and what segments of the sensed data were sensed in the second environment by comparing the sensed data with the sensor data patterns.

22. The article of manufacture of claim 21, wherein the non-transitory machine readable computer storage medium has instructions that program the computer system to:

associate segments of the sensed data with one of the first test scenario and the second test scenario based on the comparison performed by the processing unit.

* * * * *